United States Patent [19]

Pitt et al.

[11] Patent Number: 5,744,295

[45] Date of Patent: Apr. 28, 1998

[54] ANTISTATIC COMPOSITION CONTAINING ANIONIC AND CATIONIC SURFACE ACTIVE AGENTS WHEREIN BOTH SURFACE ACTIVE AGENTS COMPRISES POLYOXYALKYLENE GROUPS

[75] Inventors: Alan Robert Pitt, Sandridge; Julian Claudius Caesar, Stratford; Colin James Gray, Wealdstone, all of United Kingdom

[73] Assignee: Eastman Kodak Company, Rochester, N.Y.

[21] Appl. No.: 298,009

[22] Filed: Aug. 30, 1994

[30] Foreign Application Priority Data

Sep. 24, 1993 [GB] United Kingdom ............... 9319790

[51] Int. Cl.$^6$ ........................................ G03C 1/85
[52] U.S. Cl. ........................ 430/527; 430/529; 252/500; 252/511
[58] Field of Search ............................ 430/527, 529; 252/500, 511

[56] References Cited

U.S. PATENT DOCUMENTS

| | | | |
|---|---|---|---|
| 3,884,699 | 5/1975 | Cavallo et al. | 430/527 |
| 4,582,781 | 4/1986 | Chen et al. | 430/527 |
| 4,891,307 | 1/1990 | Mukunoki et al. | 430/527 |
| 4,999,276 | 3/1991 | Kuwabara et al. | 430/527 |
| 5,137,802 | 8/1992 | Ueda et al. | 430/527 |
| 5,254,448 | 10/1993 | Yamada et al. | 430/527 |

FOREIGN PATENT DOCUMENTS

| | | |
|---|---|---|
| 319951 | 6/1989 | European Pat. Off. . |
| 370404 | 5/1990 | European Pat. Off. . |
| 62/275245 | 11/1987 | Japan . |
| 63/116150 | 5/1988 | Japan . |
| 63/316041 | 12/1988 | Japan . |
| 1417915 | 12/1975 | United Kingdom . |
| 1439402 | 6/1976 | United Kingdom . |

*Primary Examiner*—Christopher G. Young
*Attorney, Agent, or Firm*—Andrew J. Anderson

[57] ABSTRACT

An antistatic composition comprises a hydrophilic colloid, e.g. gelatin, and a plurality of surface active agents comprising an anionic surface active agent and a cationic surface active agent. At least one of the anionic and cationic surface active agents comprises at least one polyoxyalkylene group. The accumulation of electrostatic charge on an element, e.g a photographic element, may be prevented by coating a surface of the element with an aqueous dispersion of the antistatic composition and drying the coated surface.

18 Claims, No Drawings

ANTISTATIC COMPOSITION CONTAINING ANIONIC AND CATIONIC SURFACE ACTIVE AGENTS WHEREIN BOTH SURFACE ACTIVE AGENTS COMPRISES POLYOXYALKYLENE GROUPS

FIELD OF THE INVENTION

The invention relates to an antistatic composition and a method of preventing the accumulation of electrostatic charge on an element. The composition is particularly suitable for use in a photographic element.

BACKGROUND OF THE INVENTION

Antistatic compositions have been coated on solid surfaces to prevent the accumulation of electrostatic charge. Electrical discharges resulting from accumulated electrostatic charge can be damaging for many reasons. For example, safety can be prejudiced where there is a risk of explosion or fire. Some products are adversely affected by electrical discharges. Electronic products such as integrated circuits and semi-conductor devices are sensitive to electrical impulses. Electrical discharges in photographic elements will fog the photosensitive layers.

Values of surface resistivity as low as $10^{12}$ ohms/square are generally considered necessary to avoid the problems of static discharge and dirt pick-up due to the accumulation of electrostatic charge. Values down to $10^{11}$ or $10^{10}$ ohms/square are desirable to give a wider margin of safety.

The use of an antistatic composition comprising a hydrophilic colloid and a combination of surface active agents in a photographic element is known. Examples of such compositions are shown in U.S. Pat. No. 4,891,307 in which the surface active agent combination includes a nonionic surface active agent comprising a polyoxyalkylene group.

A shortcoming associated with the use of a nonionic surface active agent comprising a polyoxyalkylene group is that coatings containing such a compound as an antistatic agent lose their low surface electrical resistivity after washing or photographic processing.

PROBLEM TO BE SOLVED BY THE INVENTION

The invention seeks to provide alternative antistatic compositions.

In particular, the invention provides antistatic compositions which retain their low surface electrical resistivity after washing or photographic processing.

The invention also provides antistatic compositions in which the combination of surface active agents providing the antistatic properties also provide good coating properties.

SUMMARY OF THE INVENTION

In accordance with the invention there is provided an antistatic composition comprising a hydrophilic colloid and a plurality of surface active agents characterised in that the surface active agents comprise an anionic surface active agent and a cationic surface active agent wherein at least one of said agents comprises at least one polyoxyalkylene group.

The invention also provides a method of preventing the accumulation of electrostatic charge on an element which comprises coating a surface of the element with an aqueous dispersion of the antistatic composition of the invention and drying the coating.

In another aspect, the invention provides an element comprising a support having thereon a layer of an antistatic composition of the invention.

ADVANTAGEOUS EFFECT OF THE INVENTION

An advantage of the invention is that the low electrical resistivity conferred by the antistatic composition of the invention is retained after washing or photographic processing.

An additional advantage is that the use of separate coating aids can be avoided.

DETAILED DESCRIPTION OF THE INVENTION

The antistatic composition of the invention can be prepared by forming an aqueous dispersion of the hydrophilic colloid and the surface active agents. The resulting composition can be coated on an insulating support to reduce the resistivity of the support.

A preferred hydrophilic colloid is gelatin e.g. alkali-treated gelatin (cattle bone or hide gelatin) and acid-treated gelatin (pigskin gelatin) or a gelatin derivative e.g. acetylated gelatin and phthalated gelatin. Other suitable hydrophilic colloids include naturally occurring substances such as proteins, protein derivatives, cellulose derivatives e.g. cellulose esters, polysaccharides e.g. dextran, gum arabic, zein, casein and pectin, collagen derivatives, agar-agar, arrowroot and albumin. Examples of suitable synthetic hydrophilic colloids include polyvinyl alcohol, acrylamide polymers, maleic acid copolymers, acrylic acid copolymers, methacrylic acid copolymers and polyalkylene oxides.

Suitable surface active agents may be chosen from any known surface active agents.

Examples of cationic surface active agents are as follows.

1. N-ethoxylated long chain ammonium salts including quaternised ethoxylated amines and non-ethoxylated equivalents.

These compounds are represented by general structure I:

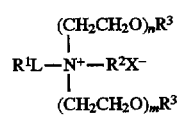

wherein $R^1$ is an alkyl, alkenyl, alkylaryl or arylalkyl chain having from 8 to 20 carbon atoms or a partially or fully fluorinated alkyl, alkenyl, alkylaryl or arylalkyl chain of equivalent hydrophobic strength e.g. having from 4–14 carbon atoms;

$R^2$ is hydrogen, methyl or benzyl;

$R^3$ is hydrogen or methyl (preferably $R^3$ is hydrogen if the sum of n and m is greater than 0;

$X^-$ is halide (preferably $Br^-$ or $Cl^-$);

L represents a suitable linking chemistry between $R^1$ and the positively charged nitrogen e.g. a covalent chemical bond or $-(CH_2CH_2O)_x-$;

each m and n independently is 0 or an integer from 1 to 20; and, x is an integer from 1 to 20.

Examples of such materials wherein $R^1$ is alkyl or alkenyl derived from natural oils, $R^2$ is methyl and $R^3$ is hydrogen are Ethoquad™ C/12, C/25, O/12 and HT/25 surfactants manufactured by Akzo Chemie, wherein the sum of n and m is 2, 15, 2 and 15, respectively, (see Trade Literature for detailed structures). Simple quaternary ammonium compounds wherein the sum of n and m is 0, $R^1$ is alkyl, R2 is methyl or benzyl and $R^3$ is methyl (i.e. alkyltrimethylammonium or alkyldimethylbenzylammonium halides) are readily available, e.g. Arquad™ surfactants manufactured by Akzo Chemie, and can be used in cases where the degree of ethoxylation associated with the anion is sufficient to make the resulting complex water soluble or dispersible.

2. Dication surfactants of general structure II.

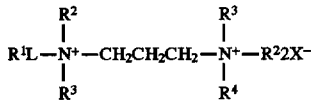

wherein $R^1$ is an alkyl, alkenyl, alkylaryl or arylalkyl chain having from 8 to 20 carbon atoms and each of $R^2$, $R^3$ and $R^4$ independently is an alkyl group having from 1 to 4 carbon atoms. An example of such a compound which is commercially available is Duoquad™ manufactured by Akzo Chemie, wherein $R^1$ is predominantly $C_{12}$ alkyl based on coconut oil and $R^2$, $R^3$ and $R^4$ are each methyl.

3. Examples of compound I, wherein $R^2$ and $R^3$ are hydrogen, can be made from Ethomeens™ (ethoxylated amines manufactured by Akzo Chemie) by simply reacting the Ethomeen™ with the appropriate hydrogen halide. Corresponding dicationic structures can be made from Ethoduomeens™ (ethoxylated diamines manufactured by Akzo Chemie). Quaternised derivatives can also be made. These dicationic compounds are represented by the general structure III:

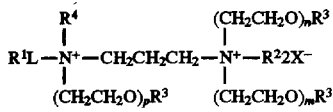

wherein $R^1$ is an alkyl, alkenyl, alkylaryl or arylalkyl chain having from 8 to 20 carbon atoms;

$R^2$ is hydrogen, methyl or benzyl;

each $R^3$ independently is hydrogen or methyl;

$R^4$ is an alkyl group having from 1 to 4 carbon atoms or benzyl;

X is halide e.g. chloride or bromide; and, each of m, n and p is 0 or an integer from 1 to 15.

Preferably, $R^3$ is hydrogen if the sum of m and n is greater than 0.

4. Ammonium salts of amine derivatives of an ethoxylated long chain hydrocarbon or fluorocarbon alcohol including the quaternary ammonium product having the general structure IV:

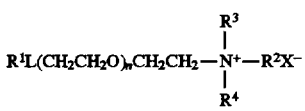

wherein $R^1$ is an alkyl, alkenyl, alkylaryl or arylalkyl chain having from 8 to 20 carbon atoms;

each of $R^2$, $R^3$ and $R^4$ independently is an alkyl group having from 1 to 4 carbon atoms or benzyl provided that if $R^2$, $R^3$ or $R^4$ is benzyl, the other two groups are not benzyl;

X is halide e.g. chloride or bromide; and, n is an integer from 1 to 30.

A specific example of a compound of structure IV is

wherein Bz is benzyl.

Examples of anionic surface active agents are as follows.

1. Sulphosuccinates having the general structure V(a):

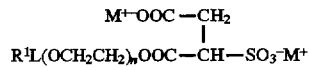

or V(b):

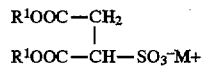

wherein each $R^1$ independently is an alkyl, alkenyl, alkylaryl or arylalkyl chain having from 8 to 20 carbon atoms;

$M^+$ is a suitable monovalent cation e.g. an alkali metal cation such as $Na^+$, $K^+$, $Li^+$; ammonium; alkylammonium such as $N(CH_3)_4^+$, $N(C_2H_5)_4^+$ and $N(C_3H_7)_4^+$; and, n is an integer from 1 to 30.

Examples of compounds having structure V(a) are: Aerosol™ 102 (Cyanamid; n=5, L=covalent bond, $R^1$=a $C_{10}$–$C_{12}$ straight chain alkyl group); Sermul™ EA176 (Servo BV; n=10, L=covalent bond, $R^1$=nonylphenyl).

Examples of compounds having structure V(b) are: Aerosol™ MA (Cyanamid; $R^1$=hexyl); and the compound described in U.S. Pat. No. 4,968,599 ($R^1$=n–$C_3F_7CH_2$).

2. Phosphates having the general structure VI:

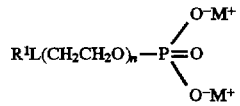

wherein $R^1$ is an alkyl, alkenyl, alkylaryl or arylalkyl chain having from 8 to 20 carbon atoms;

L is a simple linking group such as —O— or a covalent bond;

$M^+$ is a suitable monovalent cation e.g. an alkali metal cation such as $Na^+$, $K^+$, $Li^+$; ammonium; alkylammonium such as $N(CH_3)_4^+$, $N(C_2H_5)_4^+$ and $N(C_3H_7)_4^+$; and, n is an integer from 1 to 30.

Examples of compounds having structure VI are: Sermul™ surfactants EA211, EA188, and EA205 (Servo BV, $R^1$=nonylphenyl, L=—O—, $M^+$=$Na^+$, and n=6, 10, and 50, respectively).

3. Sulphates having the general structure VII:

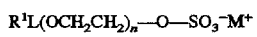

wherein $R^1$ is an alkyl, alkenyl, alkylaryl or arylalkyl chain having from 8 to 20 carbon atoms or a fluoroalkyl group having 4 to 14 carbon atoms L is a simple linking group such as —O— or a covalent bond;

$M^+$ is a suitable monovalent cation e.g. an alkali metal cation such as $Na^+$, $K^+$, $Li^+$; ammonium; alkylammonium such as $N(CH_3)_4^+$, $N(C_2H_5)_4^+$ and $N(C_3H_7)_4^+$; and, n is 0 or an integer from 1 to 30.

Examples of compounds having structure VII are: sodium dodecyl sulphate ($R^1$=dodecyl, n=0); Sermul™ surfactants EA54, EA151, EA146 (Servo BV, $R^1$=nonylphenyl, L=covalent bond, $M^+=Na^+$ and n=4, 10, and 15, respectively); Polystep™ B23 ($R^1$=dodecyl, and n=10); sulphated derivatives of Brij™ 76 and 78 (ICI, $R1=C_{18}H_{37}$ (average), L=covalent bond, and n=10 and 20, respectively).

4. Sulphonates having the general structure VIII:

$$R^1L(OCH_2CH_2)_nSO_3^-M^+$$

wherein $R^1$ is an alkyl, alkenyl, alkylaryl or arylalkyl chain having from 8 to 20 carbon atoms;

L is a simple linking group such as —O— or a covalent bond;

M is a suitable monovalent cation e.g. an alkali metal cation such as $Na^+$, $K^+$, $Li^+$; ammonium; alkylammonium such as $N(CH_3)_4^+$, $N(C_2H_5)_4^+$ and $N(C_3H_7)_4^+$; and, n is 0 or an integer from 1 to 30.

Examples of compounds having structure VIII are: Triton™ X-200 (Rohm and Haas, $R^1$=t-octylphenyl, L=covalent bond, n=2–4 nominal and $M^+=Na^+$); FT248™ (Bayer, $R^1$=perfluorooctyl, L=covalent bond, n=0 and $M^+=N(C_2H_5)_4^+$).

5. Fluorocarboxylates having the general structure IX:

$$R^1COO^-M^+$$

wherein $R^1$ is a fluoroalkyl chain having from 6 to 9 carbon atoms e.g. $C_7F_{15}$, $C_8F_{17}$ and $C_9F_{19}$; and, $M^+$ is a suitable monovalent cation e.g. an alkali metal cation such as $Na^+$, $K^+$, $Li^+$; ammonium; alkylammonium such as $N(CH_3)_4^+$, $N(C_2H_5)_4^+$ and $N(C_3H_7)_4^+$.

Preferably, the combination of cationic surface active agent and anionic surface active agent is present in the antistatic composition in an amount from 0.5 to 1.5, more preferably from 0.8 to 1.2 percent by weight based on the weight of the composition.

The molar ratio of cationic to anionic surface active agent is preferably from 1:2 to 2:1, most preferably 1:1.

Preferably, both cationic and anionic surface active agents comprise at least one polyoxyalkylene group.

The complex formed between the cationic and anionic surface active agents is preferably water soluble or sufficiently water dispersible so as not to deleteriously affect coating.

Optionally, other materials may be present in the antistatic composition of the invention if appropriate to enhance coating uniformity and/or surface conductivity properties, e.g. other nonionic surfactants, a low lattice energy salt such as lithium trifluoromethane-sulphonate (triflate), and a matting agent to increase surface roughness and reduce surface contact.

The hydrophilic colloid compositions of the invention are suitable for use in the preparation of photographic elements, particularly silver halide elements.

Thus, in a further aspect, the invention provides a photographic element comprising a support, at least one photographic silver halide emulsion layer and a layer of an antistatic composition as described above. Preferably, the antistatic composition layer is coated on the back surface of the photographic material.

In the following discussion of suitable materials for use in the photographic element according to the invention, reference will be made to Research Disclosure, December 1989, Item 308119, published by Kenneth Mason Publications Ltd., Emsworth, Hampshire PO10 7DQ, U.K., the disclosures of which are incorporated in their entireties herein by reference. This publication will be identified hereafter as "Research Disclosure".

The support of the element of the invention can be any of a number of well known supports for photographic elements. These include polymeric films, such as cellulose esters (for example, cellulose triacetate and diacetate) and polyesters of dibasic aromatic carboxylic acids with divalent alcohols (such as polyethylene terephthalate), paper, and polymer-coated paper.

The photographic elements according to the invention can be coated on the selected supports as described in Research Disclosure Section XVII and the references cited therein.

The radiation-sensitive layer of a photographic element according to the invention can contain any of the known radiation-sensitive materials, such as silver halide, or other light sensitive silver salts. Silver halide is preferred as a radiation-sensitive material. Silver halide emulsions can contain for example, silver bromide, silver chloride, silver iodide, silver chlorobromide, silver chloroiodide, silver bromoiodide, or mixtures thereof. The emulsions can include coarse, medium, or fine silver halide grains bounded by 100, 111, or 110 crystal planes.

The silver halide emulsions employed in the elements according to the invention can be either negative-working or positive-working. Suitable emulsions and their preparation are described in Research Disclosure Sections I and II and the publications cited therein.

Also useful are tabular grain silver halide emulsions. In general, tabular grain emulsions are those in which greater than 50 percent of the total grain projected area comprises tabular grain silver halide crystals having a grain diameter and thickness selected so that the diameter divided by the mathematical square of the thickness is greater than 25, characterized in that the diameter and thickness are both measured in microns. An example of tabular grain emulsions is described in U.S. Pat. No. 4,439,520.

Suitable vehicles for the emulsion layers and other layers of elements according to the invention are described in Research Disclosure Section IX and the publications cited therein.

The radiation-sensitive materials described above can be sensitized to a particular wavelength range of radiation, such as the red, blue, or green portions of the visible spectrum, or to other wavelength ranges, such as ultraviolet, infrared, X-ray, and the like. Sensitization of silver halide can be accomplished with chemical sensitizers such as gold compounds, iridium compounds, or other group VIII metal compounds, or with spectral sensitizing dyes such as cyanine dyes, merocyanine dyes, or other known spectral sensitizers. Exemplary sensitizers are described in Research Disclosure Section IV and the publications cited therein.

Multicolor photographic elements according to the invention generally comprise a blue-sensitive silver halide layer having a yellow color-forming coupler associated therewith, a green-sensitive layer having a magenta color-forming coupler associated therewith, and a red-sensitive silver halide layer having a cyan color-forming coupler associated therewith.

The elements according to the invention can include couplers as described in Research Disclosure Section VII, paragraphs D, E, F and G and the publications cited therein. These couplers can be incorporated in the elements and emulsions as described in Research Disclosure Section VII, paragraph C and the publications cited therein.

A photographic element according to the invention, or individual layers thereof, can also include any of a number of other well-known additives and layers. These include, for example, optical brighteners (see Research Disclosure Section V), antifoggants and image stabilizers (see Research Disclosure Section VI), light-absorbing materials such as filter layers of intergrain absorbers, and light-scattering materials (see Research Disclosure Section VIII), gelatin hardeners (see Research Disclosure Section X), oxidized developer scavengers, coating aids and various surfactants, overcoat layers, interlayers, barrier layers and antihalation layers (see Research Disclosure Section VII, paragraph K), antistatic agents (see Research Disclosure Section XIII), plasticizers and lubricants (see Research Disclosure Section XII), matting agents (see Research Disclosure Section XVI), antistain agents and image dye stabilizers (see Research Disclosure Section VII, paragraphs I and J), development-inhibitor releasing couplers and bleach accelerator-releasing couplers (see Research Disclosure Section VII, paragraph F), development modifiers (see Research Disclosure Section XXI), and other additives and layers known in the art.

Photographic elements according to the invention can be exposed to actinic radiation to form a latent image as described in Research Disclosure Section XVIII. The photographic elements can be processed to form an image by a process appropriate to the structure and intended function of the particular element. Such processes include those which produce silver images, either negative images or direct positive images. Such processes include those typically used for black and white negative film and silver prints, medical X-ray materials, and materials used in graphic arts and lithographic applications. Processes can be used which produce dye images. These include, but are not limited to, the C-41, E-6, RA-4, EP-2, ECN-2 and ECP-2A processes of the Eastman Kodak Company. Useful processes which produce dye images can produce negative or positive color images, or can produce monochrome dye images.

The preferred hydrophilic colloid compositions of the invention yield coatings that retain a low surface electrical resistivity after washing or passage through a standard set of photographic processing solutions, subject to initial concentration. This ability to retain antistatic properties after washing or photographic processing is a particular feature of the cationic/anionic surface active agent combination, since if either of the combination is coated alone at equivalent concentrations this attribute is substantially reduced, if not essentially lost. The ability of the cationic/anionic surface active agent combinations to promote the retention of antistatic properties after washing or photographic processing is an advantage over prior art compounds based on nonionic polyether-type surfactants since coatings containing these as antistatic agents lose their low surface electrical resistivity under equivalent conditions. Typical examples of prior art polyether nonionic compounds are long chain alcohol polyethoxylates or polyglycidols, particularly those based on fluorocarbon alcohols, e.g. typical formula $C_nF_{2n+1}(CH_2)_mOH$.

The invention is further illustrated by the following examples, without being limited thereby.

EXPERIMENTAL METHODS USED

1. Determination of Electrostatic Properties

To determine the electrostatic properties of the materials described in this invention the following sequence was employed:

i) The materials were coated in an aqueous gelatin composition by hand or machine;

ii) The coatings were dried;

iii) The coatings were conditioned at constant RH (15% and 50%) for at least four hours;

iv) The surface electrical resistivity was measured under constant RH using simple bar electrodes and suitable electrometer.

v) The coatings were washed with water for 2 minutes under constant conditions in an overflowing cylindrical stainless steel vessel, and then measured for surface electrical resistivity following the procedure from ii) to iv).

vi) Machine coatings were also processed through a commercial graphic arts photographic processor, an "Interpro 20RA" (IGP (UK) Ltd), and then measured for surface electrical resistivity following the procedure from ii) to iv).

2. Hand Coating

All formulations that were hand coated were comprised solely of gelatin (preferably a deionised bone gelatin), water and the surfactant combinations described. No gelatin hardeners were employed. The hand coatings were made by forming a pool of the test formulation on a horizontally mounted piece of polyethylene-terephthalate film base (thickness 0.004 inch), held by vacuum onto a chilled aluminium block (17° C.), and scraping a 5 inch wide undercut stainless steel blade (undercut by 0.005 inch) through and over the pool of sample such that a thin film was formed behind the moving blade. The film was allowed to chill set before being removed and dried.

3. Machine Coating

A typical pelloid layer of the type employed in graphic arts photographic products was used as a vehicle for the machine coating studies. Pelloid layers are generally coated on the back surface of a photographic material to impart a variety of features to the final product. Examples of possible functions of a pelloid layer are:

i) Antihalation;

ii) Curl control;

iii) Safelight protection;

iv) Matte;

v) Front-to-back recognition;

vi) Antistatic.

In the context of this invention it is the last feature that is being addressed.

| Pelloid Layer - Composition of Solution Coated: | | |
|---|---|---|
| Component | Amount | Composition of Component |
| Dry Gelatin | 25.1 g | As Component |
| Deionised Water | 180.0 g | As Component |
| Solution of Dye A | 13.8 mls | Solution Dye A = 20.3 g of Dye A/liter (also contains 68 ml/liter of an ammonia solution containing 96 ml of "890" ammonia/kg of solution) |
| Solution of Dye B | 2.1 mls | Solution Dye B = 169 g of Dye B/liter |
| Hardener Solution | 62.5 mls | 18 g of BVSM/liter (also contains 10 ml of 2.18 molar $KNO_3$) |
| Water/Surfactant solutions/ Low lattice energy salt (optional) | 512.5 g total | According to concentrations required of surfactant and low lattice energy salt |

The above pelloid formula was coated at 16 m/min coating speed at 40° C. onto 5 inch wide by 0.004 inch thick polyethylene-terephthalate film base suitably subbed to give good adhesion to gelatin-based coated layers. The coating was then chilled by passage through a chill box held at 4° C. and subsequently dried under controlled humidity and temperature so as not cause any remelting.

Cationic surfactants have often been associated with adverse photographic activity when used alone but have been considered to give acceptable properties in the presence of excess anionic surfactant. To take this into account, all the coating melts described in this invention were designed such that the anionic surfactant was stoichiometrically slightly in excess of the cationic surfactant by 10%.

Structures of Dyes A and B, and BVSM are as follows.

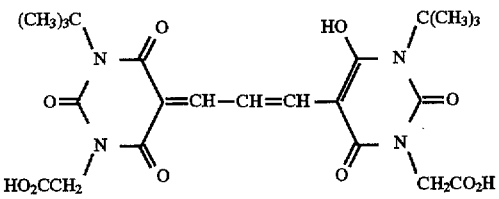

Dye A: bis-[1-butyl-3-carboxymethylbarbituric acid-(5)]trimethineoxonol.

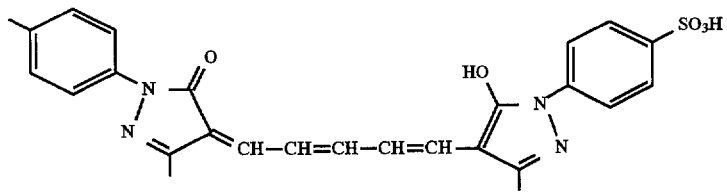

Dye B: bis-[3-methyl-1-p-sulphophenyl-5-pyrazolone-(4)]pentamethineoxonol.

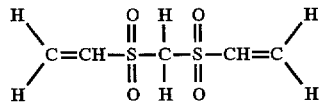

BVSM: bis(vinylsulphonyl)methane

4. Details of Photographic Processing using Processor "Interpro 20RA"
Developer Kodak RA2000 Developer
  Diluted 1+3 with water
  Temperature: 35° C., Duration: 30 sec
Fixer Kodak 3000 Fixer, part A only
  Diluted 1+3 with water
  Temperature: 35° C., Duration: 30 sec
Wash Water
  Temperature: 33° C., Duration: 30 sec
Dry 48° C.

EXAMPLE 1

The surface resistivity before processing, after processing and after washing of a number of pelloid coatings containing different combinations of cationic and anionic surfactants in accordance with the invention is given in Table 1.

TABLE 1

| SURFACE ELECTRICAL RESISTIVITY OF PELLOID COATINGS WITH ETHOQUADS C/25, C/12 AND ARQUAD C/50 ||||||| 
|---|---|---|---|---|---|---|
| CATIONIC SURFACTANT | ANIONIC SURFACTANT | TOTAL WT % SURFACTANT COMPLEX | WT % $CF_3SO_3Li$ | LOG SURFACE ELECTRICAL RESISTIVITY 50% RH (15% RH) |||
| | | | | Unprocessed | Processed | Washed |
| Ethoquad C/25 | Polystep B23 | 1.2 | — | 9.9 (10.9) | 11.9 (13.6) | 9.9 (10.4) |
| Ethoquad C/25 | Polystep B23 | 1.2 | 0.6 | 9.9 (11.5) | 11.6 (13.1) | 9.7 (10.2) |
| Ethoquad C/25 | Sermul EA151 | 1.2 | — | 10.5 (11.2) | 12.2 (13.1) | 10.6 (10.9) |
| Ethoquad C/25 | Sermul EA151 | 1.2 | 0.6 | 11.1 (12.4) | 12.0 (12.7) | 10.6 (10.8) |
| Ethoquad C/12 & C/25 mixed 9:1 respectively | Sermul EA151 | 1.2 | — | 10.8 (11.7) | 10.9 (12.3) | 10.5 (11.4) |
| Ethoquad C/12 & C/25 mixed 3:2 respectively | Polystep B23 | 0.6 | — | 11.5 (13.8) | 11.7 (13.9) | 10.4 (11.5) |
| Ethoquad C/12 & C/25 mixed 3:2 respectively | Polystep B23 | 1.2 | — | 10.0 (11.3) | 11.3 (13.0) | 10.2 (11.1) |
| Ethoquad C/25 | Triton X200 | 1.2 | — | 10.1 (11.9) | 11.9 (14.1) | 10.1 (10.9) |
| Ethoquad C/25 | Aerosol OT | 1.2 | — | 10.3 (11.2) | 12.7 (14.7) | 10.7 (11.5) |
| Ethoquad C/25 | FT 248 | 0.6 | — | 10.7 (11.4) | 12.2 (14.7) | 10.9 (11.6) |
| Ethoquad C/25 | FT 248 | 1.2 | — | 10.4 (11.1) | 12.2 (14.3) | 10.9 (11.6) |
| Ethoquad C/25 | Difluoroalkyl sulphosuccinate from U.S. Pat. No. 4 968 599 | 0.6 | 0.3 | 10.2 (11.2) | 13.0 (14.9) | 10.6 (11.7) |
| Ethoquad C/25 | — | 0.6 | — | 10.9 (12.3) | 13.7 (15.0) | 11.0 (11.9) |

TABLE 1-continued

SURFACE ELECTRICAL RESISTIVITY OF PELLOID COATINGS WITH ETHOQUADS C/25, C/12 AND ARQUAD C/50

| CATIONIC SURFACTANT | ANIONIC SURFACTANT | TOTAL WT % SURFACTANT COMPLEX | WT % $CF_3SO_3Li$ | LOG SURFACE ELECTRICAL RESISTIVITY 50% RH (15% RH) | | |
|---|---|---|---|---|---|---|
| | | | | Unprocessed | Processed | Washed |
| Ethoquad C/25 | — | 1.2 | — | 10.1 (11.0) | 12.9 (14.8) | 10.6 (11.4) |
| Arquad C/50 | Sermul EA146 | 1.2 | 0.6 | 10.3 (12.2) | 10.8 (11.8) | 10.1 (11.0) |
| Ethoquad C/25 | Sodium salt of sulphated Brij 76 (ICI) | 1.2 | — | 10.1 (11.1) | 11.5 (12.6) | 10.7 (11.6) |
| Ethoquad C/25 | Sodium salt of sulphated Brij 78 (ICI) | 1.2 | — | 10.3 (11.9) | 10.9 (11.9) | 10.7 (12.2) |

The data in this table are limited with respect to the hydrophobic group of the cationic moiety, i.e. the hydrophobic group is based on coconut oil which corresponds to a broad range of hydrocarbon chain lengths, $C_{12}$ being the predominant chain length. The data shows that pelloid coatings based on this premise generally retain a low surface resistivity after washing. Surface resistivities (15% RH) after washing are generally 1-2 orders of magnitude less than those relating to the nonionic materials listed in Table 5 hereafter. Furthermore, seven of the examples exhibit surface resistivities (50% RH & 1.2% conc.) after photographic processing that are 0.5–1.5 orders of magnitude less than the corresponding data listed for the nonionic materials. However, not all combinations survive processing.

EXAMPLE 2

Additional surface resistivity data for coated pelloid compositions based on further combinations of cationic and anionic surfactants in accordance with the invention are shown in Table 2.

TABLE 2

SURFACE ELECTRICAL RESISITIVITY OF COATINGS WITH ETHOQUADS HT/25 & Q/12

| CATIONIC SURFACTANT | ANIONIC SURFACTANT | TOTAL WT % SURFACTANT COMPLEX | WT % $CF_3SO_3Li$ | LOG SURFACE ELECTRICAL RESISTIVITY 50% RH (15% RH) | | |
|---|---|---|---|---|---|---|
| | | | | Unprocessed | Processed | Washed |
| Ethoquad HT/25 | Sermul EA146 | 0.6 | — | 10.8 (11.8) | 12.0 (13.5) | 10.6 (11.1) |
| Ethoquad HT/25 | Sermul EA146 | 0.8 | — | 10.8 (12.0) | 12.1 (13.8) | 10.9 (11.5) |
| Ethoquad HT/25 | Sermul EA146 | 1.0 | — | 10.3 (11.3) | 11.2 (11.8) | 10.5 (11.3) |
| Ethoquad HT/25 | Sermul EA146 | 1.2 | — | 9.7 (10.6) | 10.4 (11.1) | 10.3 (10.9) |
| Ethoquad HT/25 | Triton X200 | 0.6 | — | 10.1 (11.6) | 11.7 (13.5) | 10.7 (11.7) |
| Ethoquad HT/25 | Triton X200 | 0.6 | 0.3 | 10.4 (11.6) | 11.6 (13.5) | 10.4 (11.1) |
| Ethoquad HT/25 | Triton X200 | 1.2 | — | 9.5 (10.9) | 11.3 (12.3) | 10.6 (11.5) |
| Ethoquad HT/25 | Triton X200 | 1.2 | 0.6 | 9.3 (10.5) | 10.1 (11.0) | 10.0 (10.8) |
| Ethoquad HT/25 | Sodium dodecyl sulphate | 1.2 | — | 9.8 (10.7) | 10.8 (11.6) | 11.1 (12.7) |
| Ethoquad HT/25 | Sermul EA151 | 0.6 | — | 10.7 (11.9) | 11.9 (13.6) | 10.4 (11.0) |
| Ethoquad HT/25 | Sermul EA151 | 1.2 | — | 9.8 (10.8) | 11.1 (11.8) | 10.3 (11.0) |
| Ethoquad HT/25 | Sermul EA54 | 1.2 | 0.6 | 10.0 (11.1) | 11.1 (12.1) | 10.3 (10.8) |
| Ethoquad HT/25 | Sermul EA211 | 0.6 | — | 10.5 (12.1) | 11.9 (13.7) | 11.1 (12.4) |
| Ethoquad HT/25 | Sermul EA211 | 0.6 | 0.3 | 9.8 (10.5) | 12.3 (14.3) | 11.4 (12.8) |
| Ethoquad HT/25 | Sermul EA211 | 0.8 | — | 10.2 (11.5) | 11.4 (12.5) | 10.9 (12.0) |
| Ethoquad HT/25 | Sermul EA211 | 0.8 | 0.4 | 10.0 (10.7) | 11.5 (12.9) | 11.2 (12.4) |
| Ethoquad HT/25 | Sermul EA211 | 1.0 | — | 9.9 (11.4) | 10.9 (12.2) | 10.5 (11.5) |
| Ethoquad HT/25 | Sermul EA211 | 1.0 | 0.5 | 9.3 (10.2) | 10.8 (12.1) | 10.4 (11.2) |
| Ethoquad HT/25 | Sermul EA211 | 1.2 | — | 9.3 (10.7) | 10.2 (11.3) | 10.4 (11.4) |
| Ethoquad HT/25 | Sermul EA211 | 1.2 | 0.6 | 8.9 (9.9) | 10.4 (11.7) | 9.9 (10.7) |
| Ethoquad HT/25 | Sermul EA188 | 0.6 | — | 10.1 (11.5) | 12.2 (14.1) | 11.3 (12.8) |
| Ethoquad HT/25 | Sermul EA188 | 0.6 | 0.3 | 9.9 (10.7) | 12.4 (14.5) | 11.4 (12.8) |
| Ethoquad HT/25 | Sermul EA188 | 1.2 | — | 9.5 (10.9) | 10.4 (11.7) | 10.1 (11.4) |
| Ethoquad HT/25 | Sermul EA188 | 1.2 | 0.6 | 9.0 (9.9) | 10.2 (11.6) | 10.1 (11.0) |
| Ethoquads HT/25 & Q/12 4:1 respectively | Sermul EA146 | 1.2 | — | 10.0 (11.0) | 10.7 (11.4) | 10.5 (11.3) |
| Ethoquads HT/25 & Q/12 4:1 respectively | Sermul EA146 | 1.2 | 0.6 | 9.7 (10.5) | 11.0 (11.6) | 10.5 (11.1) |
| Ethoquad HT/25 | Sodium salt of sulphated Brij 78 | 1.2 | — | 10.6 (11.0) | 10.9 (11.8) | 10.8 (11.7) |

These data are also limited with respect to the hydrophobic group of the cationic moiety, i.e. in this table the hydrophobic group is based on a broad range of longer hydrocarbon chain lengths, $C_{18}$ being the predominant chain length. The data clearly show that low resistivities can be retained in the coated pelloid compositions after processing or washing. The best examples exhibit surface resistivities after photographic processing that are 2.5–3 orders of magnitude below the corresponding data with nonionic compounds shown in Table 5 (dependent on concentration and RH). Generally, the combinations described in Table 2 perform better in this respect than those described in Table 1 and hence the longer chain $C_{18}$ ethoxylated cations are preferred to the corresponding shorter chain compounds.

EXAMPLE 3

The surface resistivities at 50% RH of hand coated layers containing various surfactant combinations before and after washing with water as previously described are shown in Table 3.

are on average ~2 orders of magnitude greater than the four example systems in Table 3 pertaining to this invention. Experience with previous data drawing cross comparisons between results obtained after water washing and after photographic processing indicate that combinations of ethoxylated cationic surfactant with anionic polymer would not survive photographic processing. (Note: surface resistivities are lower after water washing than after photographic processing showing that the latter is generally far more damaging to surface conductive properties than the former.)

The Zonyl FSN controls illustrate the significant beneficial effect of lithium triflate on the lowering of surface resistivity of coatings containing such nonionic antistats and the general loss of surface resistivity of coatings containing nonionic antistats on washing.

TABLE 3

SURFACE ELECTRICAL RESISTIVITY OF HAND COATINGS WITH ETHOXYLATED CATIONIC-ANIONIC SURFACTANT COMBINATIONS, ETHOXYLATED CATIONIC SURFACTANT-ANIONIC POLYELECTROLYTE COMBINATIONS AND NONIONIC SURFACTANT CONTROL, BEFORE AND AFTER WASHING.

| CATIONIC SURFACTANT | ANIONIC SURFACTANT | TOTAL WT % | WT % $CF_3SO_3Li$ | LOG SURFACE ELECTRICAL RESISTIVITY at 50% RH | |
|---|---|---|---|---|---|
| | | | | Unwashed | Washed |
| Ethoquad C/25 | Polystep B23 | 1.2 | — | 9.7 | 9.5 |
| Ethoquad HT/25 | Sermul EA146 | 1.2 | 0.6 | 10.3 | 9.3 |
| Ethoquad C/25 | Sermul EA151 | 1.2 | — | 10.1 | 9.9 |
| Ethoquad C/25 | Sermul EA188 | 1.2 | 0.6 | 9.5 | 9.5 |
| Ethoquad C/25 | Versa TL-70 | 1.2 | — | 10.6 | 11.3 |
| Ethoquad C/25 | Versa TL-70 | 1.2 | 0.6 | 10.4 | 12.3 |
| Ethoquad C/25 | Versa TL-125 | 1.2 | — | 11.1 | 11.9 |
| Ethoquad C/25 | Versa TL-125 | 1.2 | 0.6 | 9.5 | 11.7 |
| Ethoquad HT/25 | Versa TL-125 | 1.2 | — | 9.3 | 11.4 |
| Ethoquad HT/25 | Versa TL-125 | 1.2 | 0.6 | 9.4 | 11.6 |
| Nonionic Control | Zonyl FSN | 0.6 | — | 11.3 | 12.9 |
| Nonionic Control | Zonyl FSN | 0.6 | 0.3 | 9.9 | 13.0 |
| Nonionic Control | Zonyl FSN | 1.2 | — | 10.7 | 12.8 |
| Nonionic Control | Zonyl FSN | 1.2 | 0.6 | 9.4 | 12.7 |

Ethoxylated cationic surfactant combinations with ethoxylated anionic surfactant are compared with ethoxylated cationic surfactant combinations with anionic polymers (sulphonated polystyrenes, such as the Versa TLTM series) associated with electroconductivity. Zonyl FSN is used as a nonionic surfactant control.

Table 3 clearly illustrates that if the anionic surfactant is replaced with an anionic polymer such as a sulphonated polystyrene, which is known as an electroconductive polymer, that the surface conductive properties of the resulting systems do not survive washing that well. The surface resistivities (50% RH) of such systems after water washing

EXAMPLE 4

The soluble cationic-anionic surfactant combinations of this invention, which are added to aqueous gelatin compositions to act as surface conductive antistatic agents when the compositions are coated and dried, are also effective as coating aids in their own right, producing even uniform coatings.

However, additional coating aids can be used without seriously affecting the antistatic properties. The effect of using coating aid Olin 10 G (nonylphenyl decaglycidol) is shown in Table 4.

TABLE 4

SURFACE ELECTRICAL RESISTIVITY OF PELLOID COATINGS CONTAINING AN ETHOQUAD HT/25-SERMUL EA146 COMBINATION, WITH AND WITHOUT COATING AID OLIN 10G, BEFORE AND AFTER PROCESSING/WASHING.

| CATIONIC SURFACTANT | ANIONIC SURFACTANT | TOTAL WT % SURFACTANT COMPLEX | WT % $CF_3SO_3Li$ | WT % COATING AID Olin 10G | LOG SURFACE ELECTRICAL RESISTIVITY 50% RH (15% RH) | | |
|---|---|---|---|---|---|---|---|
| | | | | | Unprocessed | Processed | Washed |
| Ethoquad HT/25 | Sermul EA146 | 1.2 | — | 0.3 | 10.2 (10.8) | 10.8 (11.2) | 10.8 (11.2) |
| Ethoquad HT/25 | Sermul EA146 | 1.2 | — | — | 9.7 (10.6) | 10.4 (11.1) | 10.3 (10.9) |

Comparative Example 1

The surface resistivity before processing, after processing and after washing of a range of pelloid coatings containing nonionic surfactants of a polyether nature is shown in Table 5.

resistivity in coatings containing a combination of ethoxylated cationic surfactant and ethoxylated anionic surfactant relative to coatings containing the cationic or anionic moiety in isolation.

TABLE 5

SURFACE ELECTRICAL RESISTIVITY OF PELLOID COATINGS CONTAINING NONIONIC SURFACTANTS OF A POLYETHER NATURE

| NONIONIC SURFACTANT | TOTAL WT % SURFACTANT COMPLEX | WT % $CF_3SO_{3Li}$ | LOG SURFACE ELECTRICAL RESISTIVITY 50% RH (15% RH) | | |
|---|---|---|---|---|---|
| | | | Unprocessed | Processed | Washed |
| Zonyl FSN Fluoro-alkyl Polyethyleneoxide | 0.6 | 0.3 | 10.0 (10.4) | 13.2 (14.7) | 12.8 (14.1) |
| $C_6F_{13}CH_2$-decaglycidol | 1.2 | 0.6 | 9.8 (12.2) | 13.1 (14.6) | 11.3 (12.8) |
| $C_7F_{15}CH_2$-pentadecaglycidol | 1.2 | — | 10.8 (12.7) | 12.7 (14.2) | 11.2 (12.8) |
| $C_7F_{15}CH_2$-pentadecaglycidol | 1.2 | 0.6 | 10.0 (12.0) | 12.8 (14.1) | 11.1 (12.6) |
| Olin 10G (nonylphenyldeca-glycidol) | 1.2 | — | 11.2 (13.1) | 12.5 (13.7) | 11.2 (13.1) |
| Olin 10G (nonylphenyldeca-glycidol) | 1.2 | 0.6 | 10.9 (14.4) | 12.9 (14.3) | 11.4 (13.9) |

This table shows clearly that any low surface resistivity imparted to the coating by the surfactant is mostly lost on passing through the nominated photographic processing solutions. This is particularly evident at low RH (15%) where photographic products are more prone to electrostatic charging. It is also evident at low RH (15%) that surface resistivities after washing are $>10^{12}$ ohms/square.

Comparative Example 2

The corresponding surface resistivity data for coated pelloid compositions where the cationic or anionic moiety of a cationic-anionic complex as described in this invention has been coated in isolation at an equivalent wt % are shown in Table 6.

TABLE 6

SURFACE ELECTRICAL RESISTIVITY OF COATINGS CONTAINING EITHER ETHOXYLATED CATIONIC SURFACTANT OR ETHOXYLATED ANIONIC SURFACTANT ALONE

| SINGLE SURFACTANT | WT % SURFACTANT | WT % $CF_3SO_3Li$ | LOG SURFACE ELECTRICAL RESISTIVITY 50% RH (15% RH) | | |
|---|---|---|---|---|---|
| | | | Unprocessed | Processed | Washed |
| Ethoquad C/25 (cationic) | 1.2 | — | 10.8 (14.2) | 12.2 (14.8) | 12.8 (14.6) |
| Ethoquad C/25 (cationic) | 1.2 | 0.6 | 9.1 (9.9) | 12.2 (13.7) | 12.6 (14.8) |
| Ethoquad HT/25 (cationic) | 1.2 | — | 11.0 (14.3) | 12.2 (14.4) | 12.8 (14.7) |
| Ethoquad HT/25 (cationic) | 1.2 | 0.6 | 9.0 (9.6) | 11.9 (13.7) | 12.6 (15.0) |
| Triton X200 (anionic) | 1.2 | — | 10.3 (13.9) | 13.5 (15.0) | 12.9 (14.8) |
| Triton X200 (anionic) | 1.2 | 0.6 | 10.0 (14.2) | 14.1 (15.0) | 12.8 (15.0) |
| Sermul EA146 (anionic) | 1.2 | 0.6 | 10.8 (13.7) | 12.8 (14.7) | 11.3 (13.1) |
| Sermul EA151 | 1.2 | 0.6 | 11.2 (14.0) | 13.0 (14.8) | 11.8 (13.7) |

Comparison of this data with previous data shows clearly that:

i) In the absence of a low lattice energy salt (lithium triflate), there is a synergistic lowering of surface ii) In coatings containing 1.2% of the cationic or anionic moiety in isolation, the surface resistivities at 15% RH after processing or washing are 2–4 orders of magnitude higher than the majority of those obtained when the cationic and anionic compounds are coated in combination.

We claim:

1. An antistatic composition comprising a hydrophilic colloid, an anionic surface active agent and a cationic surface active agent, wherein both the cationic and anionic surface active agents comprise at least one polyoxyalkylene group.

2. A composition according to claim 1 wherein the hydrophilic colloid is gelatin.

3. A composition according to claim 1 wherein the cationic surface active agent and anionic surface active agent are present in the antistatic composition in a combined amount of from 0.5 to 1.5 percent by weight based on the weight of the composition.

4. A composition according to claim 1 wherein the molar ratio of cationic to anionic surface active agent is from 1:2 to 2:1.

5. A composition according to claim 1 wherein the cationic surface active agent is a quaternised ethoxylated amine.

6. A composition according to claim 1 wherein the anionic surface active agent is an ethoxylated phosphate, sulphate, sulphonate or sulphosuccinate.

7. An element comprising a support having thereon a layer of an antistatic composition according to claim 1.

8. An element according to claim 7, further comprising at least one photographic silver halide emulsion layer.

9. An element according to claim 8 wherein the hydrophilic colloid of the antistatic composition is gelatin.

10. An element according to claim 8 wherein the cationic surface active agent and anionic surface active agent are present in the antistatic composition in a combined amount of from 0.5 to 1.5 percent by weight based on the weight of the composition.

11. An element according to claim 8 wherein the molar ratio of cationic to anionic surface active agent in the antistatic composition is from 1:2 to 2:1.

12. An element according to claim 8 wherein the cationic surface active agent in the antistatic composition is a quaternised ethoxylated amine.

13. An element according to claim 12 wherein the anionic surface active agent in the antistatic composition is an ethoxylated phosphate, sulphate, sulphonate or sulphosuccinate.

14. An element according to claim 8 wherein the anionic surface active agent in the antistatic composition is an ethoxylated phosphate, sulphate, sulphonate or sulphosuccinate.

15. An element according to claim 8 wherein the layer of an antistatic composition is coated on the opposite surface of the support from the photographic silver halide emulsion layer.

16. A method of preventing the accumulation of electrostatic charge on an element which comprises coating a surface of the element with an aqueous dispersion of an antistatic composition according to claim 1 and drying the coated surface.

17. A method according to claim 16 wherein the hydrophilic colloid of the antistatic composition is gelatin.

18. A method according to claim 16 wherein the cationic surface active agent is a quaternised ethoxylated amine, the anionic surface active agent is an ethoxylated phosphate, sulphate, sulphonate or sulphosuccinate, and the molar ratio of cationic to anionic surface active agent in the antistatic composition is from 1:2 to 2:1.

* * * * *